United States Patent Office 3,312,697
Patented Apr. 4, 1967

3,312,697
PROCESS FOR THE PREPARATION OF CYANURIC CHLORIDE
Jean Riethmann, 32 Judengasslein, Allschwil, Basel-Land, Switzerland, and Jörg Kallen, 1 Rheinparkstrasse, Birsfelden, Basel-Land, Switzerland
No Drawing. Filed Nov. 20, 1961, Ser. No. 153,723
Claims priority, application Switzerland, Nov. 22, 1960, 13,063/60
5 Claims. (Cl. 260—248)

The present invention relates to the production of cyanuric chloride and, more particularly, to a catalytic process for the preparation of cyanuric chloride of excellent quality and in high yield by the trimerization of cyanogen chloride in the vapor phase and in the presence of chlorinating agents and an activated carbon catalyst having an extremely long life.

Cyanuric chloride is a very useful chemical intermediate for the manufacture of many products, as for example chemotherapeutic agents, herbicides, dyes, brightening agents, synthetic resins, plastics, rubber, explosives and other materials. For many of these uses, particularly in the manufacture of brightening agents, it is requisite that the cyanuric chloride employed be of a relatively high degree of purity.

It is well known in the art that cyanuric chloride can be prepared from cyanogen chloride in the vapor phase using charcoal as catalyst. However, with this process a highly incomplete conversion is achieved. This is also the case even if the process is modified by admixing hydrochloric acid with the cyanogen chloride or by impregnating the charcoal with chlorides of the metals calcium, magnesium, barium, strontium or zinc. Thus, this method does not lend itself at all, or only with very considerable difficulty, to economical large-scale production, for the incomplete conversion requires recovery and recycle of the unreacted cyanogen chloride, and with charcoal the utilization factor of the reaction column in terms of space and time is very small.

Another process which is based on active carbon as catalyst represents an improvement, it is true, inasmuch as a practically complete conversion of the cyanogen chloride is obtained, but the process has the following four major technical disadvantages:

(1) The active gas adsorption carbon (gas activated or zinc chloride activated carbon) used must be subjected to a separate intense pre-drying at temperatures between 700° and 1000° C. prior to feeding it to the reaction column.

(2) The cyanogen chloride employed must be free from hydrocyanic acid, chlorine and water. But even under the most favorable conditions, including pre-drying of the active carbon to a water content of 0.5% or less, a relatively short catalyst life of about 100 hours is obtained. This necessitates the periodical, or semi-continual, partial renewal of the catalyst in relatively short intervals. Consequently, the reaction column must be equipped to provide for the feeding and removing of the catalyst.

(3) With increasing age of the catalyst, the degree of purity of the cyanuric chloride diminishes due to the presence of such impurities as cyameluric chloride of the general formula

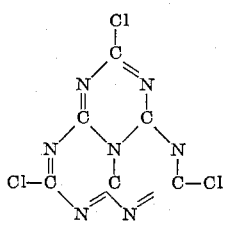

(4) The cyanuric chloride vapors which leave the reaction column at a temperature of above 200° C. must, to be purified, be passed over an active carbon filter which is heated to 250° C. and which consists of a silver cylinder filled with active carbon.

It has now been found, surprisingly and unexpectedly, that cyanuric chloride can be produced in the vapor phase by a catalytic process which, when compared with prior art processes, possesses a number of considerable technical advantages. These are as follows:

(a) Elimination of the separate pre-drying of the catalyst;

(b) Long catalyst life of at least 4500 hours, i.e., it is possible to carry out the catalytic process in a conventional reaction column without continual renewal of the catalyst;

(c) Consistently high conversion (95% of theory and more) and yield over the whole life of the catalyst at a charge rate of 500 gr./l./hr.;

(d) Consistently excellent quality of the cyanuric chloride obtained, i.e., practically white and pure material over the whole life of the catalyst;

(e) Direct recovery of the cyanuric chloride, i.e., it is not necessary to subject the cyanuric chloride vapors which leave the reaction column to a subsequent purification by means of an active carbon filter;

(f) The above-mentioned advantages exist even when the cyanogen chloride used contains as impurities hydrocyanic acid, cyanogen or hydrogen chloride.

These advantages can be realized in the practice of our novel inventive process by carrying out the trimerization of the cyanogen chloride to cyanuric chloride in the vapor phase at a temperature of above 200° C., preferably between 300° and 410° C., in the presence of chlorinating agents and an activated carbon catalyst from which metal compounds have been removed and which possesses a large inner surface.

More specifically, it has been found that the large inner surface of the active carbon catalyst (measured according to BET), as is possessed by commercially available active gas adsorption carbons, is necessary but not sufficient by itself to ensure effective and long-lasting catalytic action. It was observed that only such active carbons afford conversions of approximately 95% of theory and more which are free from harmful metal compounds, such as, e.g., oxides, hydroxides or salts of the metals of lithium, magnesium, cerium, titanium, vanadium, manganese, iron, nickel, platinum, copper, zinc, cadmium, tin, lead or bismuth. This can easily be shown experimentally. The catalytic action of active carbons from which such harmful metal compounds have been removed is reduced when such metals are added. In order to prolong the catalyst life, it is therefore necessary to either employ carbons which are free from harmful metal compounds or to remove prior to use the harmful cations from commercially available active carbons which contain such metal compounds. Removal of harmful cations can be effected by an extraction procedure which utilizes acids or alkalis or both successively and subsequent thorough washing with distilled water. Such treatment has a dual effect. First, the harmful metal compounds of, e.g., zinc, lead, tin, lithium, magnesium, cerium, titanium, vanadium, manganese, iron, nickel, copper, cadmium, bismuth and possibly of other metals, which interfere directly or indirectly with the catalytic action, are thus substantially removed. Secondly, in some cases, an appreciable enlargement of the inner surface is thus effected as a result of purification of the pores. Thus, the inner surface according to BET of a commercially available active carbon, which was extracted with hydrochloric acid and washed with water, was enlarged from 1270 to 1500 square meters per gram. In addition, the life of the active carbon was doubled by this treatment.

The choice of the material for the lining of the reaction column is closely related to the harmful effects of certain metal compounds. It is therefore desirable that the wall of the reaction chamber which is in contact with the catalyst be made from a non-metallic material, such as, e.g., graphite or glass enamel.

A further improvement is achieved by adding to the cyanogen chloride chlorinating agents, such as chlorine, phosgene, etc. In the case of chlorine, it is advantageous to use concentrations up to 10%, and preferably 5%, based on the cyanogen chloride. Provided that the active carbon is free from harmful cations, this addition prolongs the life of the active carbon catalyst exceedingly, which from the point of view of large-scale production is of vital significance. The same improvement also occurs with cyanogen chloride which contains as impurities hydrocyanic acid and/or cyanogen. Here it is important that there is less hydrocyanic acid or cyanogen present than chlorinating agent. It should be noted that even with cyanogen chloride of the purest quality, i.e. with cyanogen chloride which is practically free from hydrocyanic acid and/or cyanogen, the presence of chlorine will favorably affect the life of the active carbon catalyst.

Still another great advantage of the subject process is the fact that it is possible to employ the catalyst in relatively thin layers of, e.g., 60 mm. or less and still charge it with relatively high amounts of cyanogen chloride, as, e.g., 0.5–0.7 kilogram per liter of catalyst per hour. The active carbon used should then have at least a specific inner surface of over 1000 square meters per gram, preferably 1300–1500 square meters per gram. The cyanuric chloride obtained is so pure that, in contrast to the material obtained according to the best prior art processes, it can be recovered immediately without subsequent purification, which otherwise is usually effected by means of an active carbon filter heated to above 200° C.

The following example will further illustrate the inventive process. It is to be understood, however, that it is not intended to limit the scope of the invention in any way.

*Example*

The cyanogen chloride in gaseous form is charged from cylindrical ampules which have a volume of about 200 ml. and are placed in water baths of 20° C. The rate of flow of cyanogen chloride gas is adjusted by means of a glass stop cock to 100 ml. per minute (ca. 16 grams per hour) and measured with a rotameter. A gas line connects the rotameter with the catalyst tube. The gas line is equipped with a T-tube through which the requisite amount of chlorine (about 1 gram per hour) is fed into the flow of cyanogen chloride. In the catalyst tube, there is an appr. 6 cm. high layer of catalyst whose over-all volume is 33 ml. As catalyst is employed commercially available active carbon with an inner surface of 1270 square meters per gram, which was previously subjected to an extraction procedure at reflux for appr. 170 hours with pure hydrochloric acid (20%) in a Soxhlet apparatus, and subsequently thoroughly washed with distilled water until acid-free. The acid-soluble, inorganic components of the carbon are thus substantially removed (ash content prior to treatment: 6.1%; after treatment: 1.3%, particularly, silicic acid). The catalyst tube made from Pyrex glass is placed in a $V_4A$-steel heating mantle which is thermostatically set at 350° C. by means of an iron-constantan thermocouple as well as a thermoregulator. The reaction temperature is measured through the thermoelectric voltage produced by an iron-constantan thermocouple, movably placed inside the catalyst tube. The temperature measured as described above is self-adjusting at a maximum of 400° to 410° C. The gaseous cyanuric chloride leaves the catalyst tube and is condensed in a two-neck round-bottom flask. The unreacted cyanogen chloride as well as the chlorine are collected in a second trap which is placed in a cooling bath of isopropyl alcohol and Dry Ice. Connected with the trap, there is a bubble counter containing conc. sulfuric acid which allows to notice the escape of such noncondensed gases as traces of hydrogen chloride. This prevents at the same time air humidity from entering into the trap. The one liter round-bottom flask is sufficient to collect the daily output of catalytically formed cyanuric chloride which corresponds to the amount of cyanogen chloride from two ampules. The round-bottom flask together with the trap is exchanged daily to facilitate determination of yield, rate of conversion and quality.

After e.g. 4447 hours of use of the catalyst, the following determinations were made:

| | Total, gr. |
|---|---|
| Cyanogen chloride charged | 74,573 |
| Chlorine charged | ca. 3,500 |
| Mixture of chlorine and cyanogen chloride recovered | 7,361 |
| Cyanuric chloride obtained | 70,843 |

Conversion of cyanuric chloride calculated on the cyanogen chloride charged: 95.0% of theory. Average charge of the catalyst: 508 gr./l./hrs. which corresponds to a mean velocity of about 180 ml. of gas (0° C., 760 mm.) per ml. of catalyst per hour, and a mean contact time (temperature of 380° C., relative granular interstitial volume of 0.36) of ca. 3 sec.

The cyanuric chloride obtained, which was practically 100% pure, consisted of white crystals having a melting point of 145° to 146° C. The content of readily saponifiable by-products, as determined by saponification with ice water (calculated as $(ClCN)_x$) is less than 0.05%.

In view of the exceedingly high degree of purity of the cyanuric chloride obtained according to our novel process, direct recovery thereof is possible. It is not necessary to carry out any additional purification procedures whatsoever. Even after the catalyst had been in use for 4447 hours, the conversion obtained was about 95% of theory calculated on the cyanogen chloride charged.

An analogous reaction takes place with cyanogen chloride which contains hydrocyanic acid as a result of its method of manufacture. Amounts of, e.g., 0.5% and more, have proven to be harmless provided the chlorine present is in excess thereover. Phosgene acts in an analogous manner.

What is claimed is:

1. In a process for the preparation of cyanuric chloride by passing cyanogen chloride in the vapor phase at a temperature of above 200° C. over an activated carbon which has been treated with agents selected from the group consisting of acids, alkalis and mixtures thereof and washed with distilled water until the oxides, hydroxides and salts of the metals of lithium, magnesium, cerium, titanium, vanadium, manganese, iron, nickel, platinum, copper, zinc, cadmium, tin, lead or bismuth contained therein are removed therefrom and a specific inner surface of at least 1000 square meters per gram is achieved therein, the improvement which comprises adding to the cyanogen chloride admixed with impurities selected from the group consisting of hydrocyanic acid, cyanogen, hydrogen chloride and mixtures thereof more than 0.5% and up to 10% by weight based on said cyanogen chloride of an agent selected from the group consisting of chlorine and phosgene to prolong the life of said activated carbon provided that lesser amounts of such impurities are present than of said agent and recovering cyanuric chloride as pure material without subsequent purification.

2. A process for the preparation of cyanuric chloride according to claim 1 wherein said agent is chlorine.

3. A process for the preparation of cyanuric chloride according to claim 2 wherein about 5% of chlorine is added.

4. A process for the preparation of cyanuric chloride according to claim 1 wherein said agent is phosgene.

5. In a process for the preparation of cyanuric chloride from trimerization of impure cyanogen chloride in the vapor phase at a temperature above 250° C. over activated carbon catalyst free from harmful metal cations, the improvement which comprises adding to the impure cyanogen chloride admixed with impurities selected from the group consisting of hydrocyanic acid and cyanogen and mixtures thereof a substantial excess of chlorine to prolong the life of the activated carbon catalyst provided that lesser amounts of said impurities are present than chlorine and recovering the cyanuric chloride without further purification.

References Cited by the Examiner

UNITED STATES PATENTS 3,018,288   1/1962   Tokime et al. _____ 260—248

FOREIGN PATENTS 1,068,265   11/1959   Germany.
1,104,517   4/1961   Germany.
1,205,965   8/1959   France.

OTHER REFERENCES

Schulz et al.: Aus Forschung und Produktion, pages 454–464, Degussa, Frankfurt am Main (1953).

JOHN D. RANDOLPH, *Primary Examiner.*

I. MARCUS, WALTER A. MODANCE, *Examiners.*

UNITED STATES PATENT OFFICE
CERTIFICATE OF CORRECTION

Patent No. 3,312,697 April 4, 1967

Jean Riethman et al.

It is certified that error appears in the above identified patent and that said Letters Patent are hereby corrected as shown below:

In the heading to the printed specification, lines 4 to 6, for "Jean Riethmann, 32 Judengasslein, Allschwil, Basel-Land, Switzerland, and Jörg Kallen, 1 Rheinparkstrasse, Birsfelden, Basel-Land, Switzerland" read -- Jean Riethmann, Allschwil, Basel-Land, Switzerland and Jörg Kallen, Birsfelden, Basel-Land, Switzerland, assignors to Geigy Chemical Corporation, Greenburgh, N. Y., a corporation of Delaware --.

Signed and sealed this 1st day of July 1969.

(SEAL)
Attest:

Edward M. Fletcher, Jr.
Attesting Officer

WILLIAM E. SCHUYLER, JR.
Commissioner of Patents